United States Patent [19]

Castagna et al.

[11] Patent Number: 4,703,470
[45] Date of Patent: Oct. 27, 1987

[54] DYNAMIC ABSORBER DEVICE FOR USE WITH DISK DRIVES

[75] Inventors: Joseph T. Castagna, San Jose; Sean McEligot, Palo Alto, both of Calif.

[73] Assignee: Priam (Delaware) Corporation, San Jose, Calif.

[21] Appl. No.: 765,677

[22] Filed: Aug. 15, 1985

[51] Int. Cl.⁴ .............................................. G11B 3/10
[52] U.S. Cl. ..................................... 369/215; 360/97; 369/244; 369/247; 369/254
[58] Field of Search ............... 369/246, 230, 254, 215, 369/244, 247; 360/97

[56] References Cited

U.S. PATENT DOCUMENTS

| | | | |
|---|---|---|---|
| 3,993,315 | 11/1976 | Hansen et al. | 369/249 |
| 4,146,236 | 3/1979 | Tsukamoto | 369/254 |
| 4,587,646 | 5/1986 | Graham | 369/254 |
| 4,598,328 | 7/1986 | Frangesh | 369/247 |

FOREIGN PATENT DOCUMENTS

| | | |
|---|---|---|
| 828354 | 2/1960 | United Kingdom . |
| 1505939 | 4/1978 | United Kingdom . |
| 1574100 | 9/1980 | United Kingdom . |

Primary Examiner—Steven L. Stephan
Attorney, Agent, or Firm—Flehr, Hohbach, Test, Albritton & Herbert

[57] ABSTRACT

A dynamic absorber device for absorbing undesirable vibrations and resonances in dynamic machines, such as disk drives, is formed with a viscoelastic link element, an absorber base and an absorber mass. The link element is disposed between the absorber base and the absorber mass to absorb vibratory forces, and to minimize the effects of bending and deformation. The absorber device is assembled to disk drive components, such as the base casting or carriage, to effectively reduce vibrations, undesirable resonances and noise.

2 Claims, 12 Drawing Figures

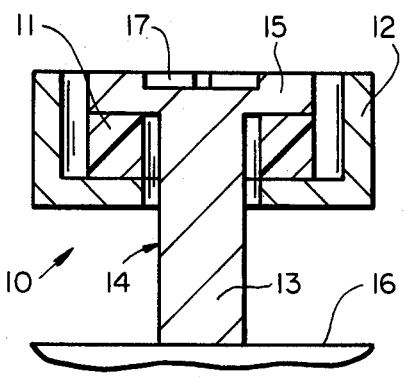
FIG_1
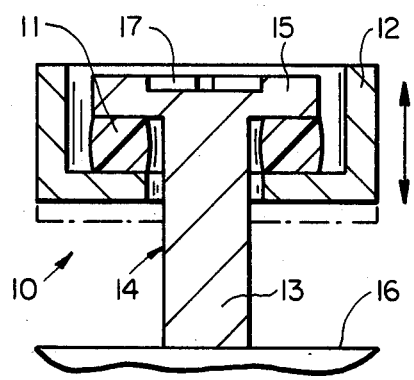
FIG_2A
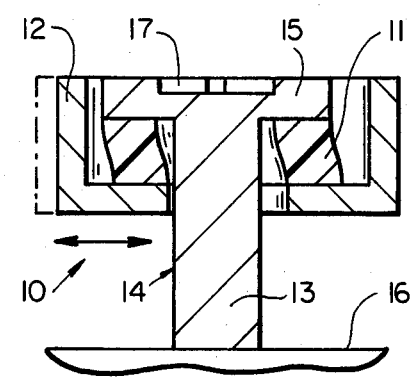
FIG_2B
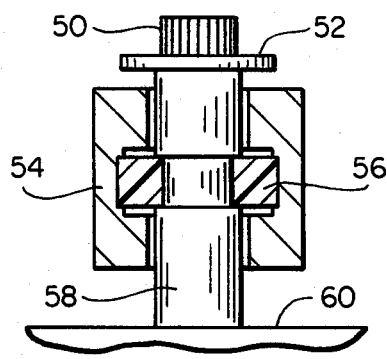
FIG_11

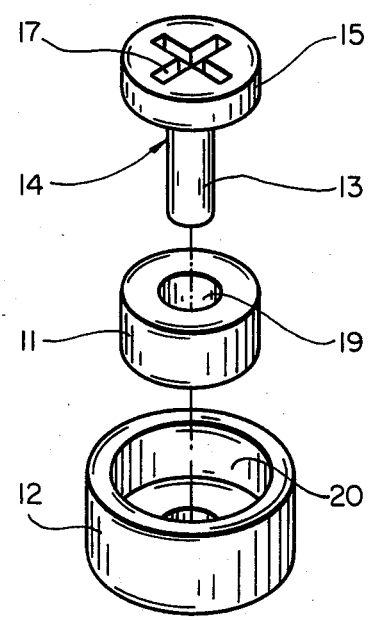
FIG_3
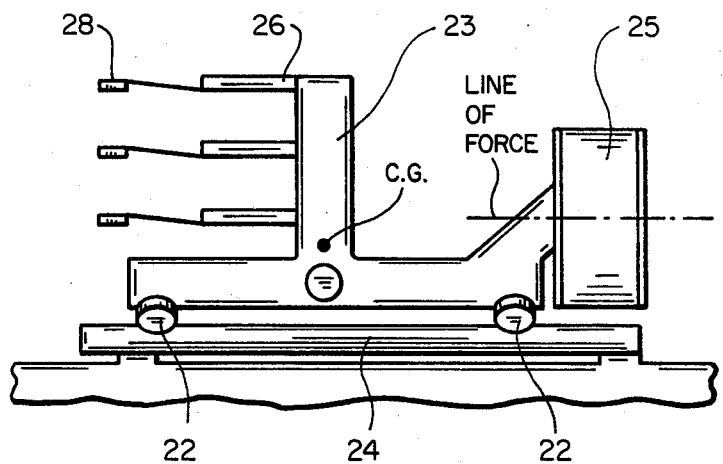
FIG_4

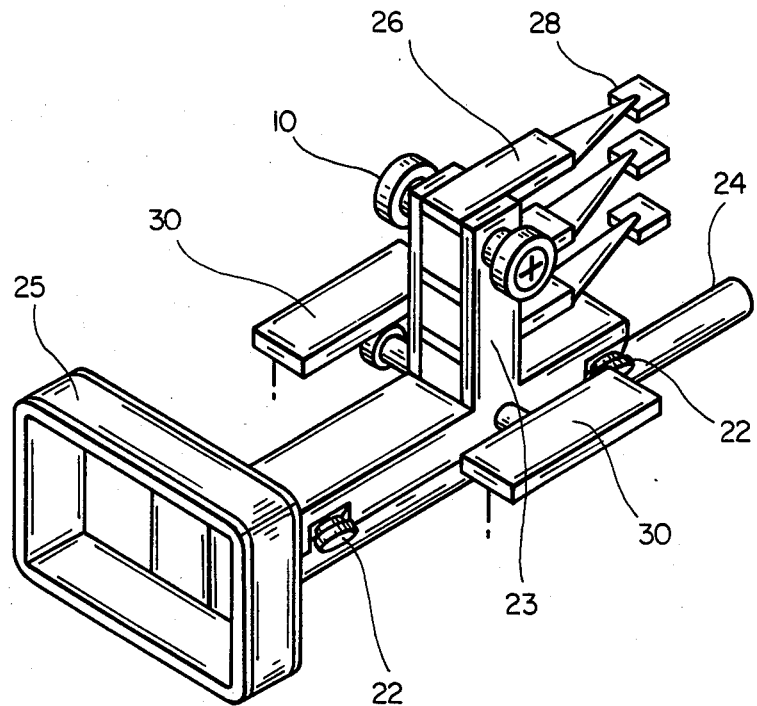
FIG_5
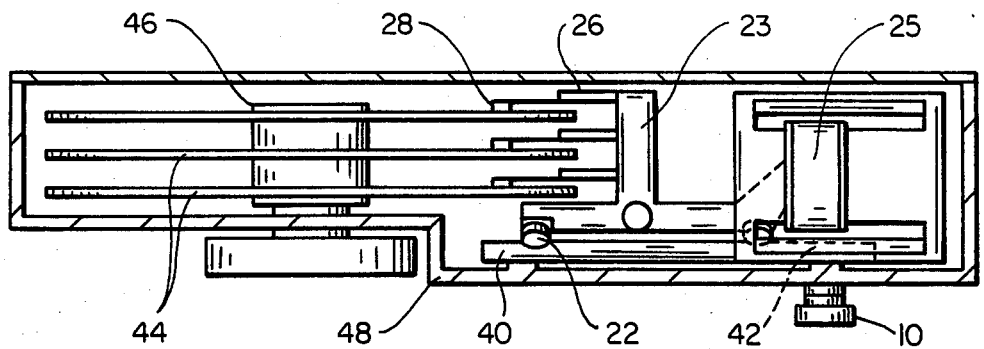
FIG_8

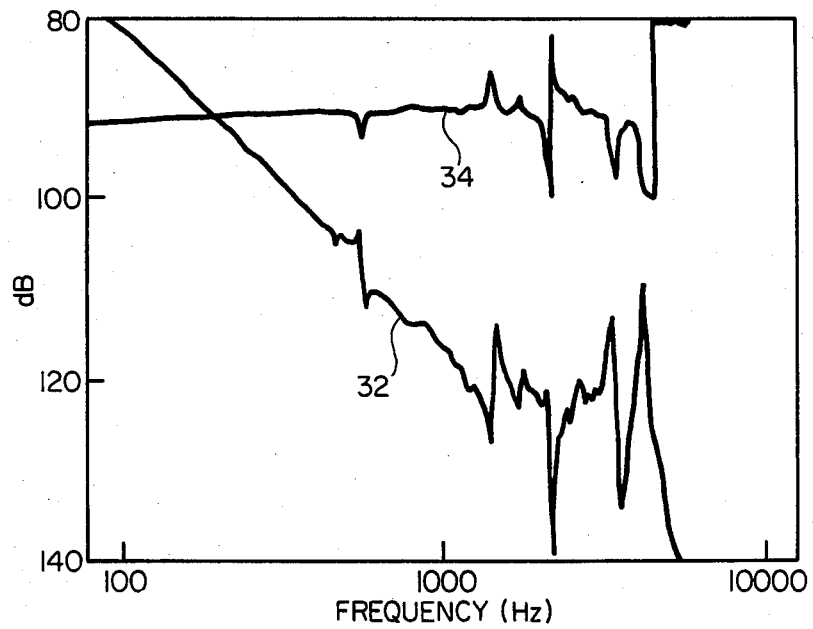
FIG_6
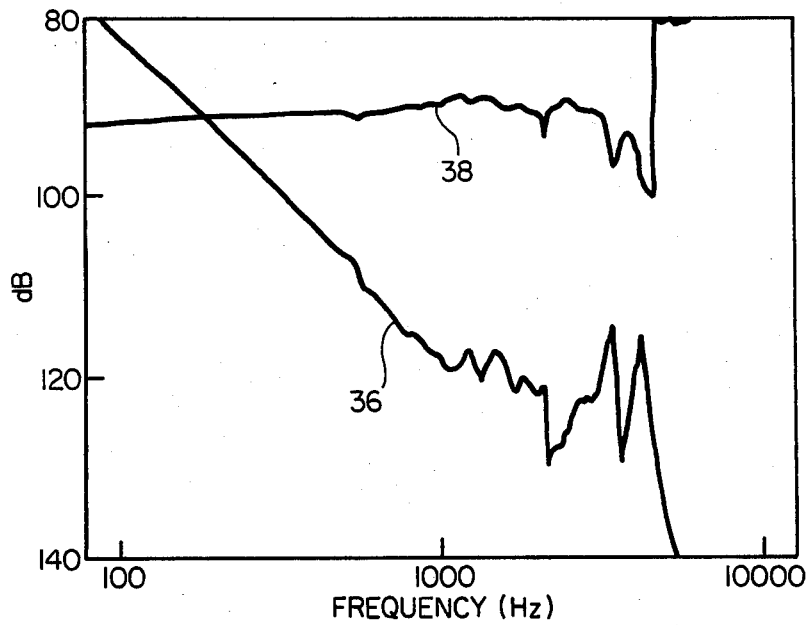
FIG_7

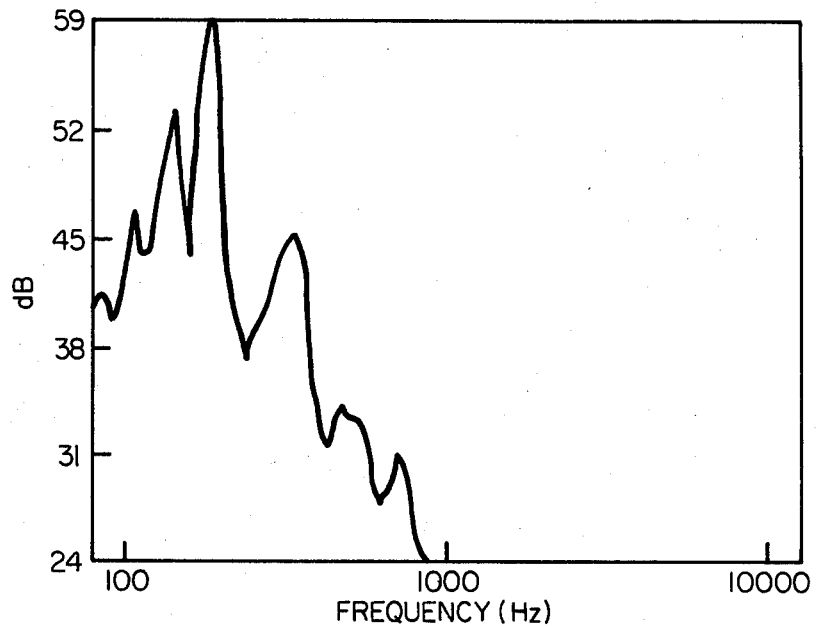
FIG_9
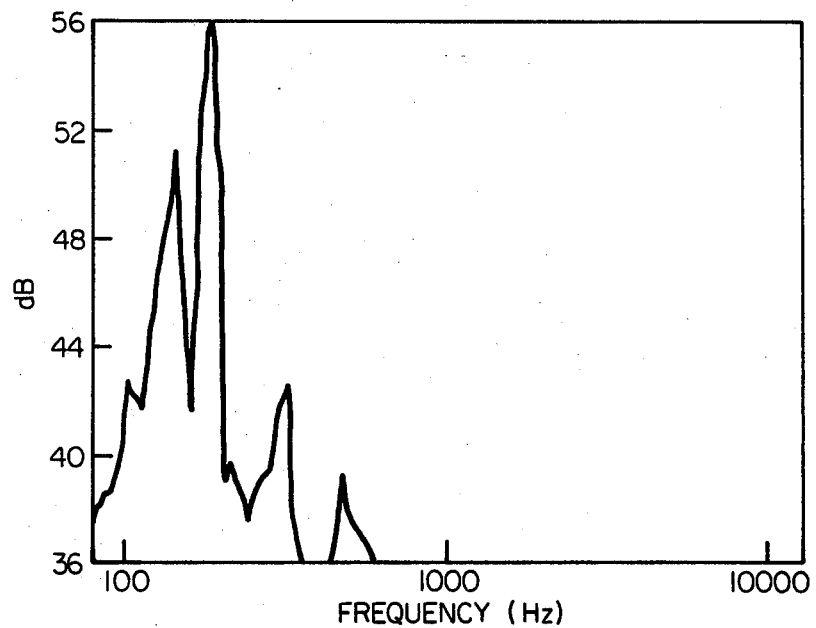
FIG_10

DYNAMIC ABSORBER DEVICE FOR USE WITH DISK DRIVES

DESCRIPTION

1. Technical Field

This invention relates to means for damping vibrations and resonances of dynamic mechanical structures, such as disk drives.

2. Background Art

It is well known that machines having moving parts are susceptible to deleterious vibratory effects which degrade the operation of the machine. For example, disk drives which use actuators and associated carriages for bidirectional accessing of data tracks of a rotating disk suffer from undesirable vibrations and resonances.

In addition, it was found that stresses are induced on the base casting and guide rails of the disk drive during operation, which tend to distort the mechanical relationship of the different components, thereby causing possible misalignment and severe noise problems. To overcome these problems, the designer would provide a stiffened base casting with ribbing, or increase the thickness and mass of the base casting. However, these solutions counteract the desirable objectives of compactness and low weight.

Furthermore, it should be noted that a major objective for improved performance of disk drives is to achieve reduction in the access time of the magnetic heads to selected data tracks of the rotating disk. The access time is dependent upon the mass of the carriage, distance between the tracks and the force available to drive the carriage between the data tracks. Thus, it is desirable to provide an increase in acceleration between the selected data tracks, which in turn requires a decrease in the mass of the carriage. The reduction of mass, if not correctly accomplished, may in effect increase the access time due to the increased severity of the structural resonances of the carriage. One of the major carriage resonances in linearly actuated carriage designs is due to the rigid body motion of the carriage mass and inertia on the bearings. At certain critical frequencies, the carriage bearings essentially act as springs and allow the carriage to pitch relative to the carriage rail supports. To counteract this pitch effect, the center of gravity of the carriage and the line of force through the center of the linear actuator or voice coil motor must be substantially in line in the seek direction. However, due to the extremely tight confines of smaller compact disk drives, this alignment is difficult to attain. The conventional approach is to provide a balance weight to adjust the center of mass of the carriage to coincide with the center of force. However, although the balance weight may solve the pitch problem, the added weight will increase access time and may exaggerate the structural resonances of the carriage assembly.

Vibration absorbing devices have been employed in the past to damp unwanted resonance frequencies of dynamic operating machines. The absorbing devices are designed to undergo a resonance at a predetermined frequency which is related to the undesired resonance frequency. Such prior art devices are overly sensitive when undergoing assembly and handling and are not deemed to be reliable since they may fail mechanically during machine operation. Also, another serious problem that may arise during manufacture of disk drives is the possible contamination of the system due to outgassing of the viscoelastic material which is used with vibration absorbing devices.

SUMMARY OF THE INVENTION

An object of this invention is to provide a novel and improved dynamic absorber for minimizing undesirable vibrations, resonances and noise in dynamic operating machines, such as disk drives.

Another object of the invention is to provide a dynamic absorber that affords small clearances between its parts thereby reducing the potential for contamination due to outgassing.

Another object is to provide a simple yet rugged dynamic absorber device that is compact and easy to assemble and handle, and yet mechanically reliable.

In accordance with this invention, a dynamic absorber is formed with a viscoelastic link element, an absorber mass and absorber base. The viscoelastic element, which has high energy absorbing characteristics, acts as a spring member and a damping member. The absorber base has an upper crown section seated on the viscoelastic element and an extending post section positioned within coaxially aligned central apertures formed in the viscoelastic link element and in the absorber mass. The assembly is attached to the structure or component that is subject to undesirable vibrations, resonances and noise at predetermined locations.

BRIEF DESCRIPTION OF THE DRAWINGS

The invention will be described in greater detail with reference to the drawings in which:

FIG. 1 is a sectional view of the dynamic absorber of this invention;

FIGS. 2A and 2B are sectional views of the dynamic absorber, illustrating the deformations experienced by the viscoelastic element in response to compressive and shear forces respectively;

FIG. 3 is an exploded view of the dynamic absorber of FIG. 1;

FIG. 4 is a schematic representational side view of a conventional disk drive assembly;

FIG. 5 is an isometric rear view of a disk drive assembly, with dynamic absorbers of this invention attached to the carriage;

FIG. 6 is a graph showing the frequency response of a linear carriage without the use of absorbers;

FIG. 7 is a graph showing the frequency response of a linear carriage with two dynamic absorbers attached thereto;

FIG. 8 is a representational side view of a disk drive assembly, wherein the novel dynamic absorber is attached to the base casting;

FIG. 9 depicts a curve of a narrow band acoustical spectrum measured on a disk drive with no absorber attached;

FIG. 10 is a narrow band acoustical spectrum measured on a disk drive with two absorbers attached; and FIG. 11 is a sectional view, partly cutaway, of an alternative dynamic absorber made in accordance with this invention.

Similar numerals refer to similar elements throughout the drawing.

DESCRIPTION OF THE PREFERRED EMBODIMENT

With reference to FIGS. 1-3, a dynamic absorber device 10 is formed with an annular viscoelastic element 11 that is seated on the bottom annular platform of a cup-like absorber mass 12. An absorber base 14 is formed with a post section 13 and a crown section 15. The link element 11 is contained in close contact between the crown section 15 and the bottom platform of the absorber mass 12. The post section 13 is positioned to pass through a central aperture 19 formed in the link element 11 and a coaxially aligned aperture 20 formed in the absorber mass 12. A slot 17 is provided on the top of the crown 15 to accommodate a hand tool for attachment of the absorber device through the post to a machine structure 16, by threaded connection or with adhesive. Clearance spaces are provided between the outer periphery of the link element 11 and the wall of the absorber mass 12, and the inner diameter of the link element and the upper section of the post 13.

In an embodiment of this invention, the material of the viscoelastic link element is preferably a vibration isolation material designated C-1002 made by E.A.R., a division of the Cabot Corp. The absorber base 14 is preferably made from aluminum, whereas the absorber mass 12 is formed from stainless steel. The viscoelastic material 11, absorber base 14 and absorber mass 12 are joined securely by means of an adhesive, or alternatively may be joined together by a mold technique.

FIGS. 2A and 2B shows the effects of excitations impacting the absorber device 10 in the compressive direction and in the shear direction respectively. The excitation forces deform the viscoelastic material, which absorbs and dissipates the applied forces. The dash lines of FIGS. 2A and 2B indicate the movement of the absorber mass vertically and horizontally in response to the excitations.

With reference to FIG. 4, a disk drive is represented which employs a carriage 23 having roller bearings 22, and is driven linearly along a guide rail 24 by a linear actuator or voice coil motor 25. The carriage supports head arms 26 to which read/write heads 28 are mounted. The center of gravity (c.g.) of the carriage is delineated as being near the bottom of the carriage tower and below the centerline of force associated with the voice coil motor. When the center of gravity and line of force are not coincident or in alignment, the carriage tends to pitch. That is, at certain critical frequencies, the carriage bearings act as springs and allow the carriage to pitch relative to the carriage rail supports.

To counteract this pitch effect, it is necessary to ensure that the carriage center of gravity related to the mass, and a line of force as produced by the voice coil motor assembly are in line in the seek or accessing direction. Such alignment is extremely difficult, particularly within the extremely tight confines of smaller disk drives. In such cases it has been customary to add a balance weight to adjust the center of mass of the carriage to coincide with the center of force of the actuator. However, adding weight to the structure tends to increase access time and may exaggerate the structural resonances of the carriage assembly, for example.

To overcome this problem, one or more dynamic absorbers 10 made in accordance with this invention are attached in opposing relationship at the top of the tower of the carriage 23, as depicted in FIG. 5. The top of the carriage tower is subject to a significant amount of motion whenever the lower part of the carriage bends due to deformation or pitching that results from the high acceleration experienced during the accessing mode of the disk drive. It has been found that the overall response of the carriage is significantly improved by use of the dynamic absorbers of this invention. This improvement is realized because the combination of the carriage and attached absorbers act much like a system having a balance weight attached, wherein the center of gravity of the carriage is modified to come closer to the line of force supplied by the magnetic motor. As a result, the moment which tends to produce a pitching motion of the carriage is effectively reduced. As the system frequency increases, the mass of the absorber moves in opposition to the motion which tends to cause the pitching of the carriage. As the resonance frequency of the absorber is approached, the maximum opposing forces are applied by the absorber to the carriage. Above 1.4 times the resonance frequency of the absorber, the mass of the absorber becomes more and more decoupled from the carriage system. The carriage motion at the point at which the absorber is attached to the carriage is controlled by the damping supplied by the viscoelastic material. An absorber that is properly tuned and which resonates close to the frequency of the system moves to oppose the sinusoidally varying forces in the elastic members of the system, thereby producing a lower overall resultant motion of the components of the system to which the absorber is attached.

The frequency response of a linear carriage operating without dynamic absorbers is illustrated in FIG. 6, wherein curve 32 represents the magnitude of displacement versus frequency, and curve 34 represents the phase relation of the displacement versus the force applied through a voice coil, under test conditions. Significant noise is experienced in an assembly without dynamic absorbers. FIG. 7 shows the smoothing of the curves 36 and 38 representing a significant reduction in noise, when using two dynamic absorbers with a linear carriage in a disk drive. Notable improvements at critical pitch frequencies are obtained with a disk drive assembly including the dynamic absorbers of this invention.

With reference to FIG. 8, a disk drive assembly includes a carriage 23 with roller bearings 22, a voice coil motor 25, head arms 26 and read/write heads 28. The bearings 22 of the carriage 23 ride on a rail that is supported at the front 40 and the rear 42 when actuated by the voice coil motor, so that the heads 28 are transported between selected data tracks of the rotating disks 44 which are mounted on a motor driven hub 46. The disk drive is assembled to a housing or base casting 48.

In keeping with this invention, a dynamic absorber 10 of the type illustrated in FIGS. 1 and 3 is located on the outer surface of the base casting below the rear rail support 42 and voice coil motor 25. At the resonant frequency of the absorber, the motion of the absorber acts in opposition to the motion of the base casting thereby reducing the motion of the base casting.

FIG. 9 portrays a sample narrow band acoustical spectrum, plotting noise in decibels versus frequency, derived from testing the noise sensed from a disk drive in which no dynamic absorbers were used. In contrast, FIG. 10 portrays a sample narrow band acoustical spectrum obtained from the same disk drive having two dynamic absorbers, made in accordance with this invention, attached to the front rail support 40 and the rear rail support 42 respectively. A significant reduction in noise level is experienced, as illustrated.

In an application of the invention to a disk drive having a carriage resonance, for example at 1200 Hz, the absorber design is made based upon the following equations:

$$f_{abs} = \frac{1}{2\pi}\left(\frac{Kg}{w}\right)^{\frac{1}{2}} \quad (1)$$

where
K is the effective stiffness of the link,
w is the weight of the absorber mass and
g is the gravitational constant.

$$K = \frac{EA}{h} \quad (2)$$

where
E equals the real part of the link dynamic modulus,
A is the area of the link in compression and
h is the height of the link.

These equations are valid when the link geometry has a shape factor between 0.2 and 1.0. The shape factor is a ratio of the area in compression divided by the area allowed to bulge, i.e., the side area. Assuming a structural resonance of 1200 Hz and a carriage weight of approximately 100 gms, an absorber mass of 10 gms is used. An initial absorber frequency is selected to be 90 percent of the 1200 Hz resonance frequency. By using these parameters in equation (1), the effective link stiffness K is determined to be 2250 lb/in. The value of the stiffness K is then inserted into equation (2) along with the value for E, which is the dynamic modulus for the chosen material. For EAR C1002 operating at 80° F., E=7250, and at h=0.25, A=0.0776 in $^2$. As a result, it can be determined that a preferred shape for the link would be circular, having a diameter of about 0.314 inch and 0.25 inch in thickness. The shape of the absorber mass preferably is circular and has a weight of about 10 gms, and is located at the center of the link section. The absorber mass is preferably made of stainless steel, of about 0.1 inch thickness and about 1 inch in diameter. The absorber mass is bonded or attached to the link, which in turn is attached or bonded to the carriage at a determined location having a large displacement which requires damping.

An alternative embodiment of a dynamic absorber made in accordance with this invention is illustrated in FIG. 11. A cylindrical absorber base 58 has a central section of reduced diameter around which a viscoelastic link material 56 is seated. The outer diameter of the link 56 is attached to the central section of an absorber mass 54. The central section of the mass has an enlarged inner diameter or groove within which the viscoelastic link is disposed. Clearances are provided between the mass and the base, and between the mass and the link to allow freedom of movement and bulging of material. A washer 52 provides a capturing mechanism so that the mass is effectively captured between the structure 60 to be controlled and the base 58. A screw 50 serves to attach the absorber to the structure 60.

This alternative absorber configuration provides the ability to adjust the frequency ratio of the shear modulus to the compression modulus which are characteristic of the absorber motion, by applying the viscoelastic material in a radial compressive mode and using the material in a shear mode along the axial direction of the absorber. The absorber configuration of FIG. 11 is useful in those cases when a frequency ratio other than that provided by the classical design equations is needed. The radial compressive frequency was determined through experiment, and a new equation was developed to accurately predict the natural frequency of the absorber in the radial direction. The natural frequency of the absorber in the axial or shear direction was modeled by the classical equation.

The absorber mass of this alternative configuration is designed so that its center of gravity, when vibrating in the radial direction is aligned with the center of gravity of the viscoelastic link in the same direction. In this way, the tendency of the absorber mass to rock on the link is eliminated.

There has been described herein novel dynamic absorber devices having a simple, compact assembly which serves to reduce substantially vibrations, resonances and noise in dynamic operating machines, such as disk drives. The dynamic absorbers of this invention can be attached externally or internally to a machine and are not subject to degradation that may result during the assembly and handling of the absorbers. The mass of the absorber is captured by virtue of a secure post, and the viscoelastic link is contained so that it does not loosen and permeate the disk drive environment. In addition, problems such as outgassing and mechanical or thermal failures of the viscoelastic material used in the absorber are minimized. The absorber may be attached by means of a hand tool without exerting any compressive or shear loads on the viscoelastic material or its joints to the absorber base or absorber mass.

What is claimed is:

1. A disk drive having structural components subject to vibrations, resonances and noise comprising:
   a bidirectional carriage for supporting accessing magnetic heads;
   a plurality of rails for guiding said carriage along a linear path;
   a base casting for supporting said carriage and rails, sand carriage, rails and base casting being subject to vibrations, resonance and noise effects;
   at least one dynamic absorber located on said carriage, rails or base casting, said absorber being tuned to a natural frequency of resonance substantially at the frequency of the component subject to deformation or vibration or noise effects, said absorber including a viscoelastic link element having a central aperture;
   an absorber mass on which said link element is seated, said mass having an aperture coaxially aligned with said central aperture of said link element;
   an absorber base having a post section protruding through said apertures and a crown section disposed on said link element, said link element surrounding at least a portion of said post section, said post section protruding through said aperture for attachment to the carriage assembly,
   the design of the dynamic absorber being such that the center of mass of the absorber mass coincides with the center of the viscoelastic link in three planes, thereby eliminating the occurrence of higher frequency modes of vibration of the absorber caused by the rocking of the absorber mass on the viscoelastic link.

2. The disk drive as defined by claim 1 wherein the dynamic absorber is designed to undergo a natural frequency at a predetermined frequency selected to coincide with the most unwanted vibration of the actuator, thereby moving in opposition to the vibration of the actuator and removing vibrational energy in the form of heat.

* * * * *